May 26, 1959 — H. T. BOSTOCK — 2,888,114
CLUTCH MECHANISM

Filed Jan. 11, 1956 — 3 Sheets-Sheet 1

Inventor
Harry Thomas Bostock
By
Bailey, Stephens & Huettig
Attorneys

May 26, 1959  H. T. BOSTOCK  2,888,114
CLUTCH MECHANISM
Filed Jan. 11, 1956  3 Sheets-Sheet 2
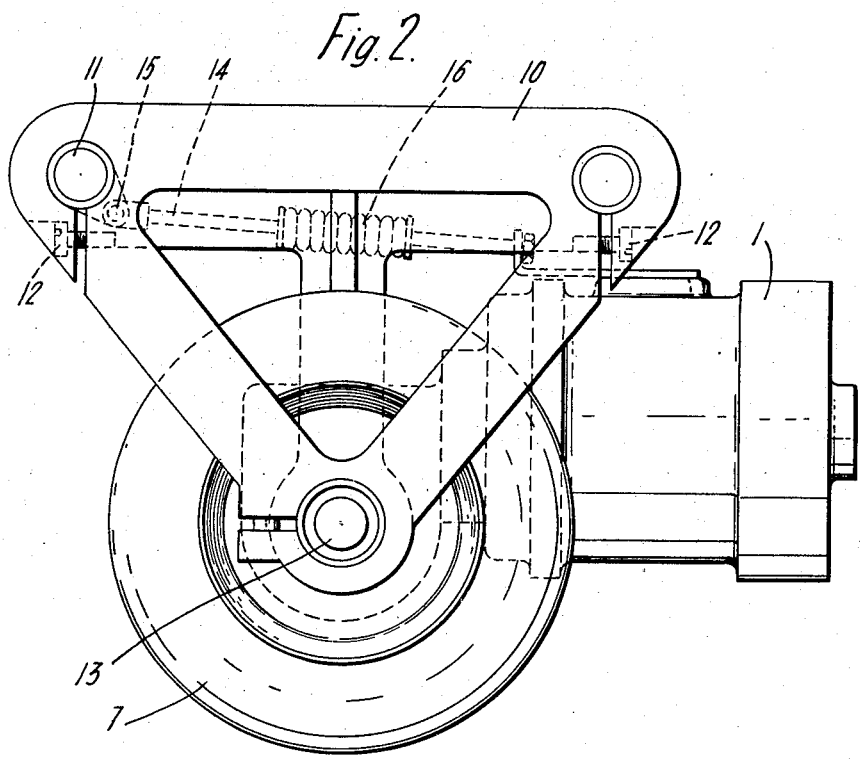
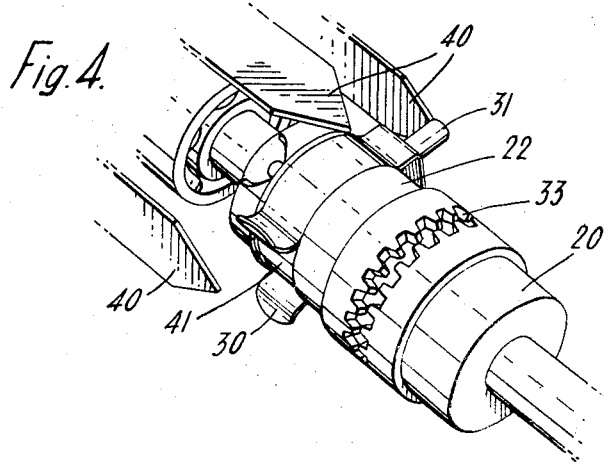
Inventor
Harry Thomas Bostock
By
Bailey Stephens & Huettig
Attorneys May 26, 1959 H. T. BOSTOCK 2,888,114
CLUTCH MECHANISM
Filed Jan. 11, 1956 3 Sheets-Sheet 3

Inventor
Harry Thomas Bostock
By
Bailey Stephens & Huttig
Attorneys

United States Patent Office 2,888,114
Patented May 26, 1959

2,888,114

CLUTCH MECHANISM

Harry Thomas Bostock, Kingston-on-Thames, England

Application January 11, 1956, Serial No. 558,497

Claims priority, application Great Britain
February 1, 1955

12 Claims. (Cl. 192—.02)

This invention relates to the driving mechanism of small vehicles such as load carrying trucks and is particularly concerned with a form of clutch for use in such mechanism. The kind of truck which is used for carrying loads in factories and so forth requires to be particularly manoeuverable so that it can be turned readily through sharp corners in order to pass down alley ways between machinery and so forth. Most usually, therefore, such a truck has only a single pair of wheels turning about a transverse axis situated substantially in the middle of its length, but in addition it may have a separate wheel at either end. The provision of a drive to the two central wheels presents considerable difficulty. In the first place it is necessary that the truck should be freely movable when no drive is being transmitted, although the additional complication of a separate clutch control is undesirable. In the second place, although differential action is required when the truck passes around the corner a normal differential gear is both too bulky and too expensive to be fitted.

According to the present invention such a vehicle is driven by a unit in which the drive is transmitted from a central driving shaft by way of two mechanically operated clutches to two outer driving shafts and thence to the wheels of the vehicle. Each clutch is operated by axial movement of an operating member produced by reaction between an end-cam surface and a co-operating member, one mounted on the driving shaft and the other on the operating member which is slightly braked so as not to turn freely. When no drive is being transmitted the clutches are consequently not in engagement and the wheels are able to turn freely so that the vehicle can be manoeuvered. As soon as power is transmitted, however, the clutches are automatically engaged and the drive is transmitted to the wheels to propel the vehicle.

Preferably each clutch is a dog-clutch, the two halves of which are pressed apart by a light spring and are formed with sloping-sided teeth so that each driven shaft is able to override the driving shaft. When power is being transmitted the reaction produced on the operating member is sufficient to overcome the spring and to engage each clutch, but as soon as the drive is stopped each clutch is disengaged by its spring. In passing round a corner, however, there is a tendency for the outer wheel to run faster than the driving shaft and, under these circumstances, the sloping construction of the teeth enables the clutch to be forced out of engagement so that the wheel is allowed to turn freely and the vehicle can be turned round the corner without difficulty. If the vehicle is required to be driven in both directions then the teeth of the clutch may be symmetrically sloped, for example, at an angle in the region of 30 degrees to the axis of the shafts, and with this arrangement the clutches may override in either direction of drive.

In a simple construction of clutch the axial movement of the operating member is produced by co-operation between a transverse pin and a V-shaped end-cam surface, one mounted on the driving shaft and the other on the operating member. When no drive is being transmitted the pin rests at the bottom of the V, but as soon as power is transmitted the rotation tends to make the pin ride up one side or other of the V, thus producing the necessary reaction to engage the clutch. As soon as the clutch is engaged the reaction is no longer required and is moreover undesirable because it may necessitate the provision of a thrust bearing for the driven shaft. Preferably, therefore, the extremities of the V are flattened so that as the clutch moves into engagement the pin bears against one of the flattened portions of the V and the end thrust is thereby substantially eliminated. Any tendency for the clutch to come out of engagement immediately results in the pin moving back to the sloping portion of the V and thus producing the necessary reaction to re-engage the clutch.

Examples of construction in accordance with the invention will now be described in more detail with reference to the accompanying drawings in which:

Figure 2 is an end view of the unit shown in Figure 1;

Figure 4 is a perspective view of a slightly modified form of clutch.

Figure 1:
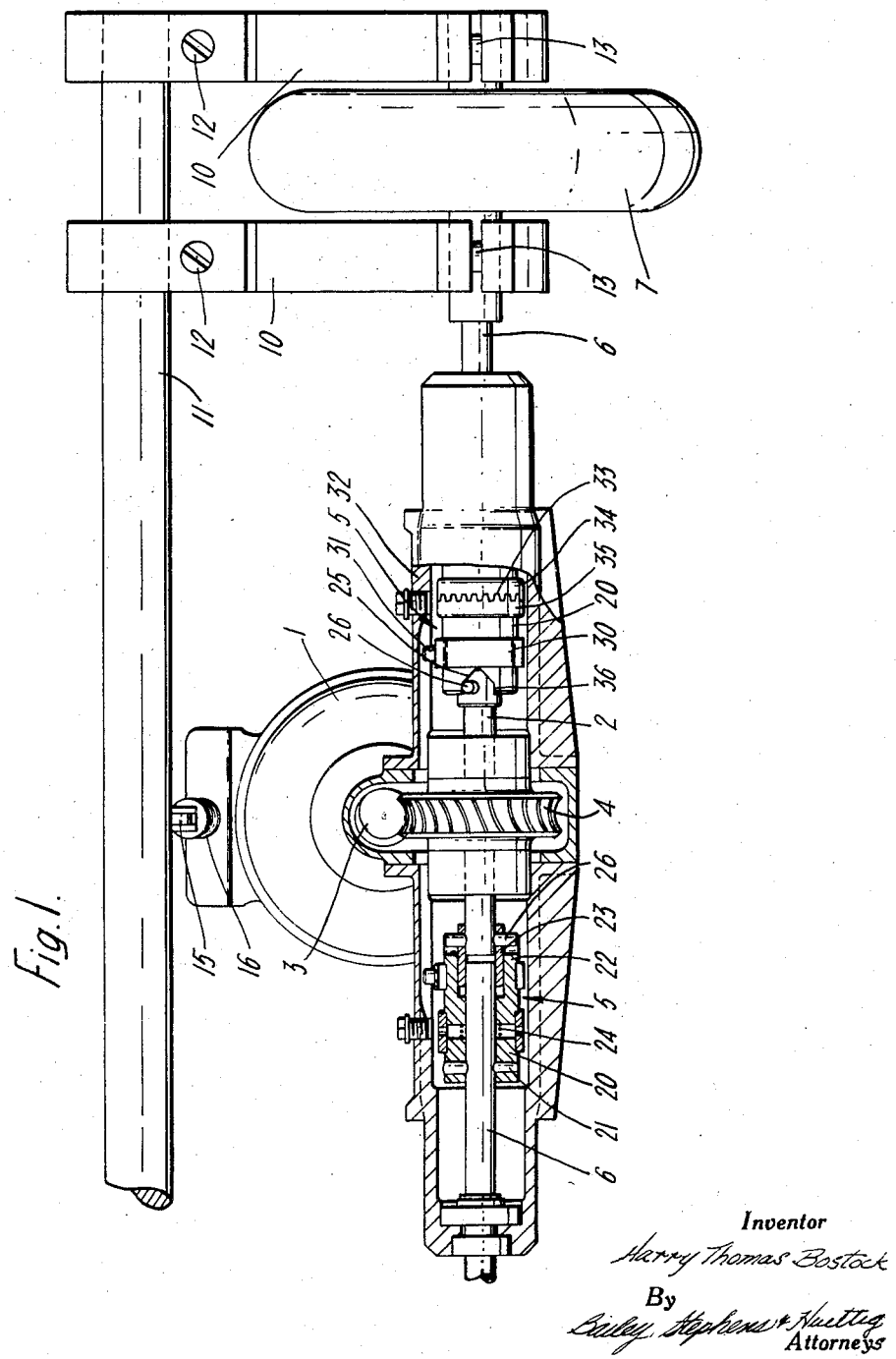
Figure 1 is an elevational view of part of a driving unit with part of the casing of the mechanism broken away.

The driving unit shown in Figures 1 and 2 includes an electric motor 1 driving a central shaft 2 by way of a worm 3 meshing with a wormwheel 4 mounted on the shaft 2. The drive from the shaft 2 is transmitted by way of a pair of similar clutches indicated generally at 5 to driven shafts 6 at the outer ends of which are mounted wheels 7.

The driving mechanism is mounted in a framework 10 which when seen in end view as in Figure 2 is triangular. The triangular sections are held together by cross bars 11 held in position in the sections 10 by screws 12. The wheels 7 turn in bearings 13 in the sections 10 and the electric motor is held in position on the shaft 2 by means of a tie rod 14 secured at 15 to one of the cross bars 11 and provided with a spring shock absorber 16. This absorbs the reaction of the driving torque and acts as a transmission safety device.

Each clutch 5 takes the form of a dog-clutch of which one half 20 is pinned to the driven shaft 6 by a pin 21, while the other half 22 is free to slide on the driven shaft 6 and on a continuation of the driving shaft 2 constituted by a sleeve 23. The two halves of the clutch 20 and 23 are normally held apart by a light spring 24 arranged internally.

The part 22 serves as a clutch-operating member and is formed with a pair of opposite V-shaped end-cam surfaces 25 co-operating with the two ends of a transverse pin 26 which projects through the driving shaft 2. The operating member 22 of the clutch is lightly braked by means of a brake-band 30 provided with a pin 31 which engages the side of a housing 32 for the mechanism and is thus prevented from rotating. When no drive is being transmitted the ends of the pin 26 lie at the bottom of the V-shaped surfaces 25 and in this position there is, of course a clearance between the two halves of the clutch which is maintained by the spring 24. Each half of the clutch is formed with a series of sloping sided teeth 33 formed on rings 34 and 35 respectively which are welded to the parts 20 and 22. The teeth 33 are symmetrically shaped and their sides slope at an included angle of approximately 30 degrees to the axis of the shaft.

As soon as drive is transmitted from the electric motor 1 the pins 26 start to rotate but the parts 22 of the clutches tend to be held by their brake bands 30. Consequently the ends of the pins 26 start to ride up one side or the other of the V-shaped surfaces 25, thus producing an end-thrust moving the operating members 22 of the clutches to bring about engagement of the clutches and thus transmit the drive to the wheel 7. When the clutches are fully engaged the ends of the pin 26 are in contact with a flattened portion 36 at the end of each of the V-shaped surfaces and in this position substantially no end-thrust is produced on the driven shafts 6. If there is any tendency for either clutch to disengage, the ends of the pin 26 move slightly down on to the inclined surface of the V 25 thus restoring once again the necessary end-thrust to re-engage the clutch.

The teeth 33 on the two halves of each clutch are so proportioned as to have a degree of play so that the clutches engage and disengage quite freely. If while drive is being transmitted to the wheels 7, either wheel attempts to turn faster than it is being driven, a reverse thrust is produced on the part 22 of the clutch, moving it out of engagement and the clutch is thereby enabled to override or free-wheel. It will be understood that under these circumstances there is a slight frictional force developed between the tips of the teeth which tends to turn the part 22 very slightly faster than it is being driven by the shaft 2 so that the surface of the V 25 is moved away from the end of the pin 26 and there is no end-thrust produced tending to re-engage to clutch. As soon as the wheel 7 returns to its normal speed there is, of course, no force produced tending to disengage the clutch and the reaction between the ends of the pin 26 and the surface of the V 25 is restored to re-engage the clutch and thus to continue to transmit drive to the wheel.

Since both the V 25 and the teeth 33 of the clutch are symmetrical they will operate equally well for either direction of drive of the electric motor 1. In other words, both clutches will engage automatically for either direction of drive and both clutches are able to override or free-wheel in either direction. Moreover, if the power is cut off before the wheels come to rest, the clutches disengage to leave the wheels perfectly free to turn. Alternatively, if the wheels are being driven up a slope and are brought to a standstill just before the power is cut off, the clutches remain engaged, thereby preventing the wheels running back.

All the time the clutch is engaged there will be a small frictional drag produced by the brake-band 30 but since normally such a clutch is designed for operation at slow speeds the effect produced will be practically negligible. If, however, the clutch is required to run for relatively long periods at somewhat higher speeds the continuing frictional effect may be eliminated by the arrangement shown in Figure 4. In this construction the two halves 20 and 22 of the clutch are engaged as previously described with reference to Figure 1. The brake-band 30 is seen in rather more detail in this figure and its pin 31 is able to co-operate with any one of a number of projections 40. The brake-band 30 co-operates with a groove 41 in the part 22 so that as the latter is moved to the right as seen in Figure 4 by reaction with the pin 26 the pin 31 moves beyond the ends of the projections 40 and is thus no longer prevented from rotating. Under these conditions, of course, the brake-band 30 rotates with the clutch and there is no further frictional effect. As soon as the drive is stopped, however, the part 22 moves to the left, and the pin 31 comes into engagement with one of the projections 40 which then prevents the brake-band 30 rotating so as to provide for the operation of the clutch on the next occasion the drive is started.

Figure 3:
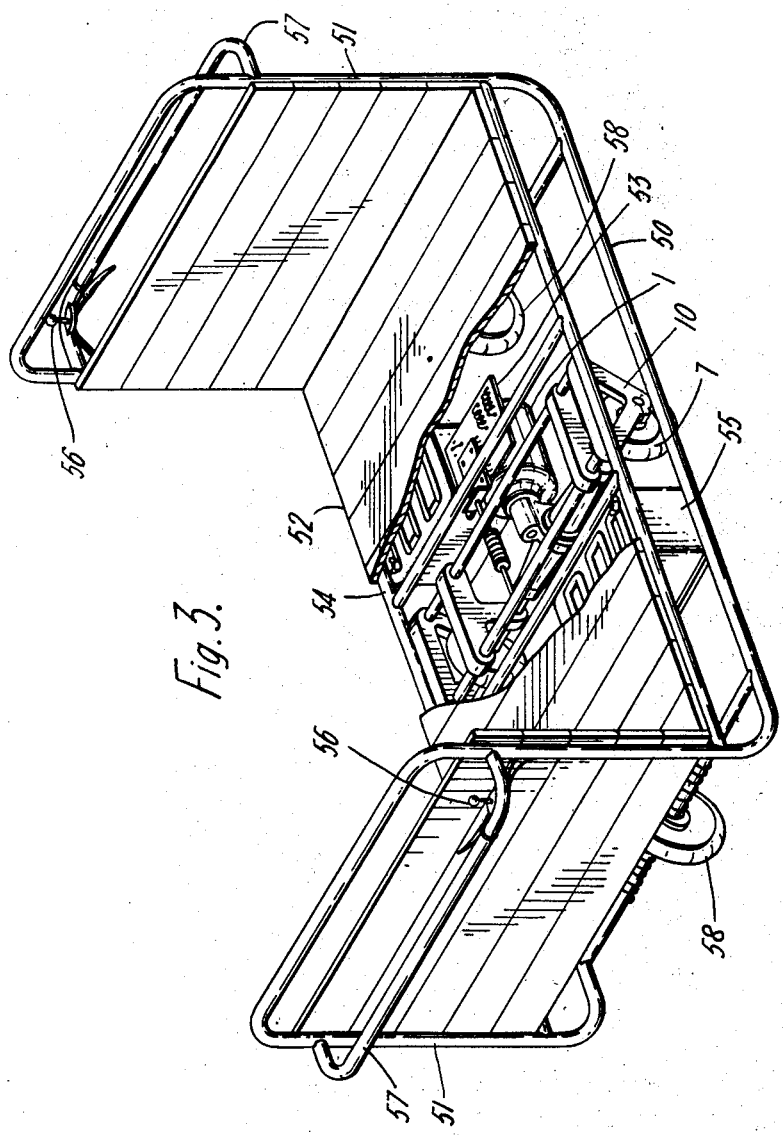
Figure 3 is a perspective view of a vehicle embodying the driving unit of Figures 1 and 2.

Figure 3 shows the driving unit of Figures 1 and 2 as applied to a vehicle such as may be used for load carrying in a factory. The truck comprises a tubular framework 50 which is mounted directly on the triangular sections 10 of the framework of the driving unit. The framework 50 is extended upwardly at the ends at 51 and the truck is decked as shown at 52, part of the decking being broken away to show the arrangement of the driving unit. Part of the controller arrangements of the electrical motor 1 are shown diagrammatically at 53 and the motor is supplied by means of batteries 54 and 55 mounted beneath the decking 52. The electric motor is controlled by means of one of two control switches 56 which are symmetrically placed on hand rails 57 at either end of the truck.

When running normally the truck is balanced and is supported only by the two wheels 7, but it is provided also with further wheels 58 which support the truck when it is stationary. By reason of the duplication of the controls 56 the truck can be controlled from either end and can be driven in either direction. It will be understood that by reason of its simple two wheel drive the truck is extremely manoeuverable and can be turned in a very sharp arc due to the overrunning of the clutches. It is, of course, important that such a truck should be of low construction which would not permit the use of a normal differential gear, quite apart from the weight and expense of this type of gear.

Although described primarily in connection with a driving mechanism for a vehicle a clutch in accordance with the invention has a variety of uses in many types of machinery when it is necessary for the clutch to be engaged at all times when a driving shaft is turning but to be disengaged when no power is being transmitted. Although clutches serving this general purpose are well known in connection with highspeed drives, such clutches rely for their operation on the effect of the inertia of moving parts of the mechanism which are, of course, not present with a relatively slowly rotating driving shaft, for example, of the order of one hundred revolutions per minute.

I claim:

1. In a vehicle driving unit comprising a framework, a driving motor mounted on said framework, a driving shaft, gearing means connecting said driving motor to said driving shaft, two driven shafts mounted coaxially with the ends of the driving shaft, a pair of clutches for connecting each of the driven shafts to the driving shaft, each said clutch including a first clutch member slidably and turnably mounted for movement on one of said shafts and second clutch member fixed on the driven shaft, means limiting the turning movement of the first clutch member with respect to the driving shaft, means normally maintaining the clutch completely disengaged, means operatively associated with the first clutch member and the frame for yieldably retarding the turning of the first clutch member with respect to the frame, said first clutch member having a cam surface at one end, and means connected to the driving shaft engageable with said cam surface whereby upon rotation of said driving shaft in either direction to exert an axial thrust on said first clutch member in a direction to engage the clutch.

2. In a device as claimed in claim 1, said cam surface comprising a V-shaped notch, and said cam surface engaging means comprising a pin within said notch and secured to the driving shaft.

3. In a device as claimed in claim 2, said notch having its end wall portions parallel to the shaft axis, said parallel end wall portions constituting the means for limiting the turning movement of the first clutch member with respect to the driving shaft.

4. In a device as claimed in claim 1, said clutch members having interengaging dog teeth, and said means for maintaining the clutch disengaged comprising a spring between said members.

5. A vehicle driving unit according to claim 4, in which the clutch teeth are symmetrically sloped at an angle in the region of 30° to the axis of the shafts, to permit overriding for either direction of drive.

6. A vehicle driving unit according to claim 1, in which the central driving shaft is driven by an electric motor through a worm drive.

7. A clutch mechanism comprising a driving shaft, a driven shaft coaxial therewith, a frame in which said shafts are mounted for rotation, and clutch means for connecting the driving shaft to the driven shaft, said clutch including a first clutch member slidably and turnably mounted for movement on one of said shafts and second clutch member fixed on the driven shaft, means limiting the turning movement of the first clutch member with respect to the driving shaft, means normally maintaining the clutch completely disengaged, means operatively associated with the first clutch member and the frame for yieldably retarding the turning of the first clutch member with respect to the frame, said first clutch member having a cam surface at one end, and means connected to the driving shaft engageable with said cam surface whereby upon rotation of said driving shaft in either direction to exert an axial thrust on said first clutch member in a direction to engage the clutch.

8. In a device as claimed in claim 7, said cam surface comprising a V-shaped notch, and said cam surface engaging means comprising a pin within said notch and secured to the driving shaft.

9. In a device as claimed in claim 8, said notch having its end wall portions parallel to the shaft axis, said parallel end wall portions constituting the means for limiting the turning movement of the first clutch member with respect to the driving shaft.

10. In a device as claimed in claim 7, said clutch members having interengaging dog teeth, and said means for maintaining the clutch disengaged comprising a spring between said members.

11. A clutch as claimed in claim 7, in which said retarding means is mounted on said first clutch member, and is disconnected from the frame when the first clutch member moves to clutch-engaging position.

12. A clutch according to claim 7, and including means for rendering said retarding means inoperative when said clutch is engaged.

References Cited in the file of this patent
UNITED STATES PATENTS

| | | |
|---|---|---|
| 577,716 | Brown | Feb. 23, 1897 |
| 878,177 | Anderson | Feb. 4, 1908 |
| 910,456 | Brush | Jan. 19, 1909 |
| 1,104,400 | Barry | July 21, 1914 |
| 1,438,051 | Moakler | Dec. 5, 1922 |
| 1,495,366 | Williamson et al. | May 27, 1924 |
| 1,871,720 | Meunier | Aug. 16, 1932 |

FOREIGN PATENTS

| | | |
|---|---|---|
| 455,090 | Canada | Mar. 8, 1949 |
| 793,002 | France | Nov. 7, 1935 |